Patented Dec. 18, 1951

2,578,967

UNITED STATES PATENT OFFICE 2,578,967

ESTERLIKE ANHYDRIDE OF HYDROXY-NAPHTHALENE TETRASULFONIC ACID

Hans Bretscher, Basel, Switzerland, assignor to J. R. Geigy A. G., Basel, Switzerland, a Swiss firm No Drawing. Application November 10, 1950, Serial No. 195,128. In Switzerland December 2, 1949

1 Claim. (Cl. 260—327)

The present invention concerns the production of a new very reactive 1-hydroxynaphthalene tetrasulphonic acid or an anhydride-like derivative of this compound which, according to this invention, is formed as the first stage of the free tetrasulphonic acid and which can be isolated.

It has been found that an ester-like anhydride of 1 - hydroxynaphthalene-2.3.4.6-tetrasulphonic acid is formed by the action of sulphonating agents, particularly of sulphuric acid containing free sulphur trioxide, on the technically easily obtainable 1 - hydroxynaphthalene - 3.6 - disulphonic acid at a raised temperature. This derivative is precipitated as a white disodium salt and can be isolated on pouring the sulphonating mixture on to ice and common salt. The constitution of this new compound can be ascertained from the following characteristic facts:

(a) Elementary analysis shows that there are 4 sulphonic acid radicals in the 1-hydroxynaphthalene molecule.

(b) The substitution of all substituents of the new compound by chlorine on the action of thionyl chloride at 220–230° C. in a sealed tube produces 1.2.3.4.6-pentachloronaphthalene (M. P. 150–151° C.) which can be oxidised into 3.4.5.6-tetrachlorphthalic acid with nitric acid.

(c) Alkaline titration of a cold, freshly prepared solution of the disodium salt of the esterlike anhydride of 1-hydroxynaphthalene-2.3.4.6-tetrasulphonic acid shows the following course of reaction:

First it requires 1 equivalent of caustic soda lye to give the aqueous solution an alkaline reaction to brilliant yellow or mimosa paper. After standing for 2 hours at room temperature, the solution again gives an acid reaction to Congo red paper. The solution now requires 1 equivalent of caustic soda lye to give an alkaline reaction to brilliant yellow and 1 further equivalent of caustic soda lye to give a permanent alkaline reaction to mimosa paper. This reaction solution does not couple with diazotised aniline, i. e. no sulphonic acid group has been split off. From the course of this titration it can be taken that an ester-like anhydride is formed between the hydroxyl group and the sulphonic acid group: first one equivalent of NaOH is required to neutralise the remaining sulphonic acid group which is still free. The anhydride splits up on standing. The second equivalent of caustic soda lye serves to neutralise the sulphonic acid group which is formed on the splitting up of the anhydride. The third equivalent of lye is required for the formation of the naphtholate (until an alkaline reaction to mimosa paper is obtained).

The monomeric intramolecular form of the formula:

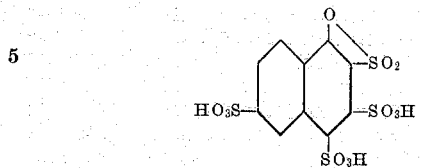

seems to be more probable than the also possible dimeric form.

(d) On treating the anhydride with phosphorus pentachloride and phosphorus oxychloride under reflux and so substituting a sulphonic acid group by chlorine, a chloro-1.2-naphthosultone disulphochloride is obtained (M. P. 253–255° C.).

(e) The 2 new sulphonic acid radicals which have entered the 1-hydroxynaphthalene-3.6-disulphonic acid molecule are easily separable by acid hydrolysis, e. g. in mineral acid aqueous solution at room temperature on re-formation of the starting product which proves that no deep alteration takes place under the reaction conditions.

(f) Also the other substituents as well as the 2 new sulphonic acid radicals become mobile to an unusual degree, so that they may easily be substituted by other groups. In this way, non-caustic alkalis in a hot aqueous solution effect the exchange of the sulphonic acid group in 3-position for a hydroxyl group and thereafter on removal of 2 sulphonic acid groups by acid hydrolysis the known valuable dyestuff intermediate product 1.3 - dihydroxynaphthalene - 6 - sulphonic acid is obtained in very good yield.

Due to the mobility of the substituents, the new 1 - hydroxynaphthalene - 2.3.4.6 - tetrasulphonic acid or the isolable disodium salt of its anhydride according to this invention is a valuable starting material for the production of naphthalene compounds for use as dyestuff intermediate products.

Sulphuric acid containing from 30–66% free sulphur trioxide is suitable for sulphonating the 1-hydroxynaphthalene-3.6-disulphonic acid according to this invention. Sulphonation is best performed at a temperature of 110–130°. 40% oleum has a particularly advantageous effect at temperatures from 120–125°. On isolating, due regard must be taken of the easy hydrolisability of the sulphonic acid groups of the new compound by working quickly at the lowest temperature possible. Also, the complete removal of the adherent mineral acid is indispensable if good yields are to be obtained. Further, it has also proved advantageous to start from as pure and concentrated 1-hydroxynaphthalene - 3.6 - disulphonic acid as possible. The salts of this acid may also be used provided they are used in the most concentrated form possible.

The following examples give some methods of performing the process and some reactions of the 1-hydroxynaphthalene tetrasulphonic acid according to this invention or of its anhydride. Parts are given as parts by weight and temperatures are in degrees centigrade.

Example 1

304 parts of 1-hydroxynaphthalene-3.6-disulphonic acid in the form of well dried disodium salt (80–87%) are gradually added to 1200 parts of 30% oleum at 20° while stirring well, whereupon the temperature rises to 85°. The sulphonating mixture is heated quickly to 125–130° and then this temperature is maintained for 4 hours. The reaction mass is then cooled to room temperature and it is then poured on to a mixture of 4500 parts of ice and 600 parts of common salt. The ester-like anhydride of the disodium salt of 1-naphthol-2.3.4.6-tetrasulphonic acid crystallises out in the form of pale yellow tiny leaves. These are immediately filtered off, and washed with salt water. The deposit is filtered off and, to remove the last traces of free mineral acid, it is stirred with 2000 parts of methanol, filtered off and dried in a vacuum at 50–60°.

The disodium salt of the ester-like anhydride of 1-hydroxynaphthalene-2.3.4.6-tetrasulphonic acid, which is obtained in a good yield, when dried is a pale yellow coloured crystal powder. It dissolves easily in water. A freshly prepared aqueous solution shows a blood-red colour on the addition of ferric chloride.

Example 2

304 parts of 1-naphthol-3.6-disulphonic acid as a well dried disodium salt (80–87% pure content) are slowly added to 1200 parts of 40% oleum while stirring well, whereupon the temperature rises to 85°. The mixture is then quickly heated to 120° and maintained at 120–125° for 4 hours after which it is cooled to room temperature. The sulphonating mixture is then poured on to a mixture of 4500 parts of ice and 600 parts of common salt while stirring briskly whereupon the disodium salt of the ester-like anhydride of 1-naphthol-2.3.4.6-tetrasulphonic acid crystallises out in the form of pale yellow tiny leaves. These are immediately filtered off and washed with salt water. The deposit is filtered, stirred with 2000 parts of methanol to remove the last traces of mineral acid, filtered under suction and dried in a vacuum at 50–60°. The yield is very good and the substance has the same chemical properties as that obtained according to Example 1.

Example 3

304 parts of 1-hydroxynaphthalene-3.6-disulphonic acid as well dried disodium salt (80–87%) are slowly added to 1000 parts of 66% oleum at 20° while stirring well, whereupon the temperature rises to 110°. The sulphonating mixture is maintained at 110–115° for 4 hours, then cooled to room temperature, and, while stirring well, it is poured onto a mixture of 4500 parts of ice and 600 parts of common salt. The disodium salt of 1 - naphthol - 2.3.4.6-tetrasulphonic acid crystallises out in the form of its ester-like anhydride in pale yellow coloured tiny leaves. It is further processed as described in Example 1. The yield is good.

What I claim is:

An ester-like anhydride of 1-hydroxynaphthalene-2.3.4.6-tetrasulphonic acid of the formula

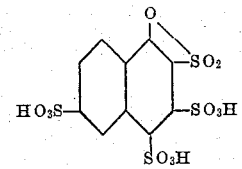

HANS BRETSCHER.

REFERENCES CITED

The following references are of record in the file of this patent:

UNITED STATES PATENTS

| Number | Name | Date |
|---|---|---|
| 2,272,272 | Mow | Feb. 10, 1942 |

FOREIGN PATENTS

| Number | Country | Date |
|---|---|---|
| 1,227 | Great Britain | of 1894 |